3,790,521
METHOD FOR MAKING NONCOLLOIDAL PARTICLES LIKE FIBERS AND POWDERS FROM LARGER GRANULES OF ETHYLENE/CARBOXYLIC ACID COPOLYMERS
Gordon D. McCann and Earl T. Dumitru, Midland, Mich., assignors to The Dow Chemical Company, Midland, Mich.
No Drawing. Filed Oct. 7, 1968, Ser. No. 765,635
Int. Cl. C08f 47/16
U.S. Cl. 260—29.6 N
8 Claims

ABSTRACT OF THE DISCLOSURE

Ethylene/carboxlylic acid copolymers of low acid content in the form of pieces such as molding granules are converted into noncolloidal particles in the nature of fine fibers, microscopic spheroids and powders by digesting in aqueous triethylamine; by digesting in aqueous alkaline media containing n-hexanol, microscopic spheroids and powders are obtained. Useful for preparation of plastic articles, coatings, and impregnations.

REFERENCE TO RELATED APPLICATIONS

The subject matter of this application is related to that of a copending application of Gordon D. McCann, Earl T. Dumitru, and James B. Louch, Ser. No. 741,903, filed July 1, 1968, now abandoned, for "Preparation of Latexes by Direct Dispersion of Acidic Organic Polymers Into Aqueous Alkaline Media." It is also related to the subject matter of an application of Gordon D. McCann and Earl T. Dumitru, Ser. No. 765,622, filed concurrently herewith on Oct. 7, 1968 for "Preparation of Latexes by Direct Dispersion of Acidic Organic Polymers Into Aqueous Alkaline Media Containing Certain Alkanols."

BACKGROUND OF THE INVENTION

This invention relates to making noncolloidal particles in the nature of fine fibers and powders from larger pieces such as granules, chips and the like of certain ethylenic polymers containing carboxylic acid groups in their molecular structure.

It is well known to make fibrous and powdered forms of normally solid thermoplastic polymers from more massive forms thereof, such as molding granules, by various procedures. For example, fibers are made by melting and extruding the polymer through small orifices as in a spinnerette; powders are made by grinding coarser pieces.

In the afore-mentioned copending and related application Ser. No. 541,903, it is disclosed that certain normally solid, water- and alkali-insoluble thermoplastic organic addition copolymers containing a plurality of acid groups in the polymer structure and which are in noncolloidal massive form such as molding granules are transformed into latexes and colloidal dispersions by digesting the massive form of polymer in admixture with alkaline aqueous liquid media until the polymer spontaneously disperses into colloidal particles in the aqueous medium.

In the afore-mentioned concurrently filed application, Ser. No. 765,622, it is pointed out that there are carboxylic acid copolymers of the kind dealt with in application Ser. No. 741,903 wherein the concentration of carboxylic acid groups is so low that the polymer disperses into colloidal (latex) form only with great difficulty, if at all. It is further disclosed that such polymers containing a plurality but low concentration of carboxylic acid groups in the polymeric structure thereof are converted into latex and colloidal dispersion forms by digesting a noncolloidal mass of the polymer in admixture with a continuous enveloping phase of an alkaline aqueous liquid medium also containing n-butanol, n-pentanol or mixtures thereof; the specified alkanolic medium enables one to effect colloidal dispersion of polymers which are dispersible only with difficulty or not at all in wholly aqueous media.

During the inventigations leading up to the above-mentioned related patent applications, it was discovered that, under some conditions, digestion of granules of certain polymers in certain aqueous liquid media resulted in the formation of non-colloidal microscopic particles in the nature of fine fibers and powders.

SUMMARY OF THE INVENTION

In accordance with this invention, certain normally solid, water- and alkali-insoluble thermoplastic addition polymers containing a plurality but low concentration of carboxylic acid groups in the polymeric structure thereof and in the form of masses in the nature of molding granules, chips and like pieces, are converted into non-colloidal particles having at least one microscopic dimension in the nature of fine fibers, small spheroidal beads and powders by digesting the granules etc. in aqueous liquid media containing triethylamine, and such spheroidal beads and powders are obtained in aqueous alkaline liquid media containing n-hexanol.

DETAILED DESCRIPTION AND EMBODIMENTS

The polymers contemplated for use in accordance with this invention and illustrated in the examples that follow are addition polymers of ethylene characterized in general in being materials that are normally solid (i.e. per se solid at normal room temperature), normally insoluble in water and in aqueous alkali (i.e. substantially insoluble both in the acid form and in neutral salt form in liquid water at normal room temperature in the absence of mutual solvents), and thermoplastic (i.e. capable of being reversibly softened by heat and hardened by cooling and moldable at temperatures below their decomposition temperature). The macromolecules of the ethylene addition polymer can be of any chemical structure provided that the massive material has the general physical properties just mentioned and further provided that the molecular structure contains a plurality, but low concentrations, of carboxylic acid groups. By "acid group" is meant a group capable of neutralization by aqueous alkali to form a water-ionizable salt, including the carboxy

(—CO$_2$H)

and the carboxylic acid anhydride groups which react with aqueous alkali to form water ionizable salt groups. The bulk of the polymeric macromolecular structure to which the acid group is attached can be of any predominately ethylene polymer provided (as stated above) the material has the required general physical properties and is chemically stable to conditions of treatment with aqueous alkali whereby the acid groups are neutralized. It will be understood that the requirement that the polymer be thermoplastic precludes any extensive degree of covalent bond cross-linking in the polymer molecular structure, although the macromolecular chains may otherwise be linear, or branched, or lightly cross-linked or associated by intermolecular forces such as by crystallization, hydrogen bonding, or ionic linkages.

It will be understood that the occurrence of carboxylic acid groups in the polymer should be general through the macromolecules thereof. That is to say, only those macromolecules which contain a substantial number of active acid groups can be expected to respond to the action of the aqueous media to make noncolloidal particle products in accordance with this invention. It is not necessary that all macromolecules in a given mass of polymer contain the same number of, or proportion of, acid groups, and in some instances the process effects a separation of dispersible material from non-dispersible material.

As hereinbefore indicated, the ethylene polymers useful herein contain low concentration of carboxylic acid groups. In general, they have from about 0.49 to about 1.53 milliequivalents (meq.) of carboxylic acid groups per gram of polymer. Polymers having more than about 1.53 meq. carboxylic acid groups per gram of polymer are usually readily converted into synthetic latexes when granules thereof are digested in wholly aqueous alkaline media as set out in the aforementioned copending related patent application Ser. No. 741,903, In case of ethylene/acrylic acid binary copolymers, this means that copolymers having less than 11 down to about 3.5 weight percent acrylic acid are converted from coarse granular form into fine fibers and/or fine spheroidal beads by the means of the present invention.

As indicated hereinbefore, the starting normally solid water-insoluble thermoplastic acid addition polymers of ethylene can be of any chemical structure provided that they have the physical properties and acid characteristics described. Typical such polymers are addition polymers of a major proportion of ethylene and a minor portion of one or more ethylenically unsaturated monomers which include at least one having an acid group of the kind specified. For example, suitable polymers are the random copolymer products of copolymerization of mixtures of ethylene and one or more polymerizable ethylenically unsaturated carboxyllic acids such as acrylic acid, methacrylic acid, maleic acid and anhydride, itaconic acid, fumaric acid, citraconic acid and anhydride, methyl hydrogen maleate, and the like, and such copolymers which also contain one or more non-acid polymerizable monomers, such as propylene, butene-1, 1,3-butadiene, and other aromatic olefins; ethyl acrylate, methyl methacrylate, vinyl acetate and other unsaturated esters; vinyl and vinylidene chloride; vinyl ethers; acrylamide; acrylonitrile; and the like. Particularly suitable copolymers include:

(1) Copolymers of ethylene and from about 3.5 to about 11% by weight of one or more ethylenically unsaturated acids such as acrylic acid, methacrylic acid, methyl hydrogen maleate, etc. as above recited;

(2) Copolymers of ethylene, from about 3.5 to about 11% by weight of one or more ethylenically unsaturated acids, and up to about 20% by weight of one or more other monomers such as ethyl acrylate, vinyl acetate, etc., as above recited;

Other polymers are made from preformed and non-acid polymers by subsequent chemical reaction carried out thereon. For example, the carboxylic acid group may be supplied by grafting a monomer such as acrylic acid or maleci anhydride onto a polymer substrate; carboxylic anhydride, ester, amide, acyl halide, and nitrile groups can be hydrolyzed to carboxylic acid groups.

Specific examples and illustrations of representative organic acid copolymers, given for purpose of illuminating the description and not to limit the scope of the invention are:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers and polymerized ethylene/propylene/acrylic acid graft copolymers.

Specific procedures and means for making such polymers are known to the art and do not constitute the essence of the present invention. While particular polymers are used in the description of the invention for purposes of illustrating the same, it will be understood that other polymers may be used. The suitability of any polymer for the present purposes can be readily ascertained by a few preliminary tests following the present description; this is particularly advantageous when the starting polymeric material is of unknown composition or history and it is not possible to ascertain its exact chemical structure.

In one aspect, the process of this invention is carried out by digesting the specified polymer pieces such as granules in liquid media which are triethylamine-water mixtures containing from about 5 to about 25% by weight of triethylamine based on the liquid medium, in amounts up to about 30%, preferably from about 5 to about 20%, by weight of the polymer based on the whole mixture, by heating. Usually, temperatures above about 90° C., e.g. from about 110° to about 160° C., are employed, preferably from about 120° to about 130° C., suitable provisions being made to maintain the media in liquid state, e.g. under autogenous pressure. In some instances, the conversion goes rapidly, and heating for a short time, e.g. 15 minutes, suffices. In other instances, heating for longer times, e.g. 16 hours or more, may be necessary to complete the conversion. In general, when gentle or mild agitation of the digestion mixture is used, such as in a slowly tumbling container or when agitated with slow to moderate turning stirrers, the granules tend to be converted to fine fibrous products. When the digestion mixture is more vigorously agitated as by higher speed stirring, the final product tends to be a noncolloidal slurry in which the dispersed particles are in the form of microscopic spheroids. With intermediate degrees of agitation, mixtures of fibrous material and spheroidal particles may be obtained. In some instances, as when the time of digestion is insufficient for complete conversion or when the starting polymer material is not uniform, the dispersed product may also contain some macroscopic particles such as fragments of the starting granules.

The fibrous products of this process are microscopic in diameter, ranging from less than 1 micron to more than 100 microns, with lengths up to about 10 cm. or more. Many of the individual fibers in such fibrous products are many times longer than the longest dimension of the granules from which they were made. On collection of the fibrous products from the slurry as by filtration, washing and drying, they can be obtained as matted, felt-like products.

The spheroidal particle products of this process are microscopic, but not colloidal, particles having average diameters in the order of from about 10 to about 100 microns. On collection from the slurry, washing and drying, these products are obtained as free-flowing powders.

By "microscopic particles" herein is meant particles having at least one microscopic dimension, but larger than colloidal particles, including fine fibers and microscopic spheroidal particles of the kind described above, and like particles.

In another aspect, the process of this invention to make non-colloidal particles, especially microscopic spheroids, is carried out by digesting the specified polymer pieces such as granules in liquid aqueous alkaline media containing n-hexanol. In this mode, the polymer again constitutes up to about 30, preferably from about 5 to about 20, percent by weight of the whole digestion mixture. The n-hexanol constitutes from about 10 to about 30, preferably from about 10 to about 20, percent by weight of the liquid medium.

The base in the alkaline aqueous medium used in making the dispersion is any water-solution inorganic base which in water solution is at least as basic as ammonia, e.g. any of the alkali metal hydroxides such as lithium hydroxide, sodium hydroxide, potassium hydroxide rubidium and cesium hydroxide, ammonium hydroxide, and mixtures of such bases.

The concentration of the alkaline base in the aqueous medium is a function of the concentration of the acid group in the starting polymer and the amount of such polymer to be dispersed in the liquid medium. Usually the amount of the base corresponds to at least 0.2 equivalent per acid group in the polymer, preferably from about 0.5 to about 1 equivalent of base per equivalent of acid group in the polymer when the base is an alkali metal hydroxide, larger amounts being preferred when ammonium hydroxide is used. When the polymer is dispersed in ammonium hydroxide in a vessel having a substantial vapor space above the liquid level, as in a conventional kettle, the amount of the ammonia charged is greater, e.g. from 5 to 10, sometimes in the order of 20 or more equivalents per acid group, to obtain rapid dispersion. Ammonia is usually used here in the form of from about 5 to about 25% by weight aqueous ammonium hydroxide.

The mixture of specified polymer granules or the like and the liquid medium of n-hexanol and aqueous base is heated, usually with agitation, until the conversion of granules to microscopic spheroids occurs. Usually, temperatures above about 90° C., e.g. from about 110° to about 160° C., are employed, preferably from about 120° to about 130° C., suitable provisions being made to maintain the media in the liquid state, e.g. under autogenous pressure. In some instances, the conversion goes rapidly, especially with more vigorous agitation and at higher temperature, and conversion may be complete in a short time, e.g. 15 minutes. In other instances heating for longer times, e.g. for 16 hours or more, may be necessary to complete the conversion. The final product is a slurry of noncolloidal microscopic spheroidal particles of the kind hereinbefore described. These particles can also be collected, washed and dried to a free-flowing powder of the polymer. In some instances, as when the digestion is interrupted before completion, there may be macroscopic particles such as fragments of the starting granules also present in the slurry, but these can usually be separated from the microscopic particles, e.g. by filtration or sieving through fine screens.

The noncolloidal particle products of this invention are useful in making plastic articles and plastic-containing articles. The slurries of fine fibers and slurries of microscopic spheroidal particles, etc. are used to deposit their particles in and on substrates. Thus, they are placed as a thin layer on a solid substrate such as paper, metal, plastic and like surfaces and dried to form coatings or layers which are generally textured and non-continuous. Such layers can subsequently be fused to increase their density, smoothness, etc. and to decrease their porosity. The slurries can also be caused to impregnate the bodies of porous substrates such as felted papers, fabrics, and non-woven fibrous mats and dried therein. The slurries can also be mixed with other kinds of slurries or latexes to form composite compositions; for example, a mixture of a slurry of paper pulp or wood pulp and a slurry of fibers or spheroidal particles as herein described can be screened, pressed and dried to form sheets of composite composition. Thus, useful articles such as gas and liquid filters, containers and other structures, and decorative sheets and finishes can be fabricated from the slurry products.

In like manner, the fibrous and spheroidal particle products of this invention can be separated from the slurry products and the dried fibers and powders used in ways familiar to the art to make useful articles. The free-flowing powders of microscopic spheroidal particles are particularly useful in fluidized bed coating of preheated metal articles, in rotational molding, and for blending with liquid media for coatings, adhesives and laminations.

Other characteristics, features and details of the process of the present invention and the products thereof are shown in the following examples which illustrate the invention but are not to be taken as limiting the same. Unless otherwise indicated, parts and percentages are by weight. All of the polymers used in these examples were normally solid, water- and alkali-insoluble thermoplastic ethylene copolymer resins made by conventional means known in the art.

Where, in the examples, a "melt flow value" of the polymer is given, this melt flow value is a measure of the flow properties of the thermoplastic material as obtained in the apparatus and by the general procedure described in the ASTM method designation D1238–65T (Condition E).

Example 1

The polymer used was a random copolymer of ethylene and an average of approximately 8% acrylic acid, having a melt flow value of 5 grams/10 minutes, in the form of molding granules that were cylinders approximately 3 mm. x 3 mm.

In this test, 20 g. of the copolymer granules was mixed with 200 g. of aqueous triethylamine in a 12-ounce citrate bottle which was capped and tumbled in a slow end-over-end manner in a constant temperature bath at 120° C. for 16 hours. When the aqueous medium contained 10% triethylamine, the granules completely disintegrated into fine fibers. When the aqueous medium contained 2.5% (or less) triethylamine, the granules swelled but did not disperse into smaller fragments.

Example 2

One hundred grams of the copolymer granules described in Example 1 was placed in a pressure vessel, equipped with mechanical stirrer and heating and cooling devices, together with 900 g. 11.1% aqueous triethylamine. With the stirrer operating at a moderate speed of 200 r.p.m., the mixture was heated at 150° C. for 18.5 hours, then cooled. The resulting product was an aqueous suspension of fine fibers, the starting granules having completely disintegrated. The fibers ranged in diameter from less than one micron to more than 100 microns, and many were longer than 3 mm. e.g. 30–45 mm. long. The fibers were recovered by filtration (from a clear yellow filtrate) and were washed with water and dried to a white fibrous mat.

Example 3

Two hundred grams of the copolymer granules described in Example 1 was treated in the manner of Example 2 by heating at 150° C. for 16 hours in 800 g. 12.5% aqueous triethylamine. The granules were completely converted into fibers of the kind described in Example 2.

Example 4

One hundred grams of the copolymer granules described in Example 1 was treated in 900 g. 11.1% aqueous triethylamine in a different pressure vessel than that of Examples 2 and 3 providing greater agitation. The mixture was heated for 30 minutes at 80°, 30 minutes at 100°, and 15 minutes at 125° C. On cooling it was found that the polymer granules had dispersed into microscopic solid spheroids ranging from 10 to 50 microns in diameter. No latex material and very few fibers were observed. On filtration, water washing, and drying, the product was obtained as a free-flowing white powder of the spheroidal particles which cleanly passed through a standard 100-mesh sieve screen.

Example 5

When Example 4 was repeated except that 400 g. of the granules were so treated in 1600 g. 12.5% aqueous triethylamine, similar results were obtained except that the cooled dispersion was quite viscous because of the higher concentration of solid particles slurried therein.

Example 6

A test was made to elucidate whether or not the fibrous products obtained from the molding granules in Examples 1–3 resulted from molecular orientations generated in the granules during their fabrication by extrusion. For this purpose, a strand of the copolymer described in Example 1, ⅛-inch in diameter (about 3 mm.) was obtained from the extruder just prior to where it would have been chopped into granules of the kind described in Example 1. Twelve-inch lengths of this strand were annealed by heating while immersed in liquid water at 120° C. for 90 minutes. The resulting annealed strands were 6–8 inches long and about 5/16 inch in diameter. These annealed strands were chopped into granules about 3/16 inch long. Ten grams of such granules were placed with 90 g. 11.1% aqueous triethylamine in a 12-ounce citrate bottle. For side-by-side comparison, granules cut from the unannealed starting strand of copolymer were similarly placed in 11.1% aqueous triethylamine in the same proportions in another such bottle. The bottles and their contents were treated in the manner and under the conditions described in Example 1. In each instance the granules fully dispersed into fibers which appeared to be identical as between the two tests, ranging in diameter from about 1 to about 100 microns.

Example 7

In this example, the effect is shown of relative rates of agitation on the nature of the resulting noncolloidal particles. For this purpose, 100-g. portions of a random copolymer of ethylene and an average of approximately 8% acrylic acid, in the form of molding granules (about ⅛ in. diam. by ⅛ in. dome-ended cylinders) were treated in 900-g. portions of 11.1% aqueous triethylamine by heating at 80° for 30 minutes, then at 100° for 30 minutes, then at 125° C. for 15 hours in a pressure vessel with variable agitation. With relatively lower agitation (150 r.p.m.), the resulting product was a dispersion of fine fibers of the kind described in Examples 1–3 and 6. With relatively higher agitation (450 r.p.m.), and the resulting product was a dispersion of microscopic (but noncolloidal) solid spheroids of the kind described in Example 4. With intermediate agitation, a mixture of fibrous material and microscopic spheroidal particles was obtained. When the time of heating at 125° C. was reduced to 3 hours at intermediate agitation, the resulting product was a mixture of fibrous material, microscopic spheroidal particles, and macroscopic particles of incompletely dispersed material.

Example 8

In this example, 200 g. of the copolymer granules described in Example 1 was treated in a stirred pressure vessel with a mixture of 96.4 g. n-hexanol and 703.6 g. 10.3% aqueous ammonium hydroxide by heating with agitation at 75° for 30 minutes, then at 95° for 30 minutes, at 110° for 60 minutes and at 125° C. for 4 hours. At 110° the granules were seen to develop a tear-drop shape with some disintegration. After 4 hours at 125° C., a few macroscopic drop-shaped fragments of the starting granules remained, but most of the polymer was in the form of microscopic spheroids in the diameter range from 20 to 50 microns. There did not appear to be any colloidally dispersed material.

In place of the particular starting plastic polymer materials, liquid media, and modes of operation employed in the specific foregoing examples, other ethylene polymers, liquid media, and procedures of the kinds and within the limits hereinbefore set forth are used with substantially the same results in converting granular and like pieces of the plastic polymer to slurries of microscopic particles of the polymer from which such particles, in the nature of fine fibers and free-flowing powders, can be recovered.

What is claimed is:

1. In a method for making non-colloidal microscopic particles having at least one microscopic dimension and being larger than colloidal particles from granules and like pieces of normally solid, water- and alkali-insoluble thermoplastic addition polymers of ethyelne, the molecular structure of said polymers containing a plurality of carboxylic acid groups capable of neutralization by aqueous alkali to form a water-ionizable salt in average concentration from about 0.49 to about 1.53 milliequivalents of carboxylic acid group per gram of polymer, the improvement which comprises digesting such polymers in the form of granules and like pieces in a liquid medium in amounts such that the starting polymer is up to about 30 percent by weight of the whole resulting digestion mixture of polymer and liquid medium being selected from the group consisting of (1) mixtures of water and triethylamine containing from about 5 to about 25% by weight of triethylamine based on the liquid medium and (2) mixtures of aqueous base and n-hexanol containing from about 10 to about 30% by weight of n-hexanol and wherein the base is selected from alkali metal hydroxides and ammonium hydroxide in amount of at least 0.2 equivalent of base per carboxylic acid group in the polymer, carrying out said digesting by agitating and heating the resulting digestion mixture at temperature above about 90° C. until the starting polymer pieces are substantially disintegrated and a slurry of microscopic particles is obtained in the liquid medium.

2. The improvement according to claim 1 wherein the starting polymer of ethylene is a copolymer of ethylene and acrylic acid.

3. The improvement according to claim 2 wherein the starting copolymer of ethylene and acrylic acid is digested in a liquid medium of water and triethylamine containing from about 5 to about 25% by weight of triethylamine based on the liquid medium, the resulting digestion mixture containing from about 5 to about 20% by weight of starting copolymer.

4. The improvement according to claim 3 wherein the digestion mixture is heated at temperature between about 110° and about 160° C. and subjected to only relatively slow agitation whereby the resulting microscopic particles comprise fine fibers having diameter in the range of 1 to 100 microns.

5. The improvement according to claim 3 wherein the digestion mixture is subjected to relatively fast agitation whereby the resulting microscopic particles comprise microscopic spheroids having average diameters of from about 10 to about 100 microns.

6. The improvement according to claim 2 wherein the starting copolymer of ethylene and acrylic acid is digested in a liquid medium of aqueous ammonium hydroxide and n-hexanol containing from about 10 to about 20% by weight of n-hexanol based on the liquid medium and from about 5 to about 25% by weight of ammonium hydroxide based on the aqueous ammonium hydroxide, the resulting digestion mixture containing from about 5 to about 20% by weight of starting copolymer, by agitating and heating the resulting digestion mixture at temperature between about 110° and about 160° C.

7. In a method for making noncolloidal microscopic particles having at least one microscopic dimension and being larger than colloidal particles from granules of normally solid, water- and alkali-insoluble thermoplastic polymers of ethylene, the molecular structure of said polymers containing a plurality of carboxylic acid groups capable of neutralization by aqueous alkali to form a water-ionizable salt in average concentration from about 0.49 to about 1.53 milliequivalents of carboxylic acid group per gram of polymer, said polymer selected from the group consisting of copolymers of ethylene and from about 3.5 to about 11 percent by weight of 1 or more ethylenically unsaturated acids selected from the group consisting of acrylic acid, methacrylic acid, methyl hydrogen maleate, maleic acid, maleic anhydride, itaconic acid, fumaric acid, citraconic acid, and citraconic anhydride and copolymers of ethylene, from about 3.5 to about 11 percent by weight of one of foregoing ethylenically unsaturated acids and up to about 20 percent by weight of another monomer selected from the group consisting of ethyl acrylate, vinyl acetate, methyl methacrylate, propylene, butene-1, 1,3-butadiene, vinyl, and vinylidene chloride, vinyl methyl ether, styrene, acrylamide, and acrylonitrile, and graft copolymers selected from the group consisting of polyethylene/acrylic acid graft copolymers, polyethylene/methacrylic acid graft copolymers; the improvement according to claim 1 which comprises digesting such polymers in the form of granules in a liquid medium in amounts such that the starting polymer is from about 5 to about 30 percent by weight of the whole resulting digestion mixture of polymer and liquid medium, the liquid medium being selected from the group consisting of (1) mixtures of water and triethylamine containing from about 5 to about 25 percent by weight of triethylamine based on the liquid medium and (2) mixtures of aqueous base and n-hexanol containing from about 10 to about 30 percent by weight of n-hexanol and wherein the base is selected from alkali metal hydroxides and ammonium hydroxides in the amount of at least 0.2 equivalent of base per carboxylic group in the polymer, carrying out said digestion by agitating and heating the resulting digestion mixture at a temperature between 110° and 160° C. for a period in the range of from 15 minutes to about 16 hours until the starting polymer pieces are substantially disintegrated and a slurry of microscopic particles is obtained in the liquid medium, said slurry containing from about 5 to about 30% by weight of polymer.

8. The improvement according to claim 7 which consists essentially of digesting such polymers in the form of cylindrical granules having length of approximately 3 millimeters and diameter of approximately 3 millimeters and diameter of approximately 3 millimeters in a liquid medium in amount such that the starting polymer is from about 5 to about 20 weight percent by weight of the whole digestion mixture of polymer and liquid medium, the liquid medium being a mixture of ammonium hydroxide solution and n-hexanol containing from about 10 to about 30 percent by weight of n-hexanol and ammonium hydroxide in amounts of at least 0.2 equivalent of base per carboxylic group in the polymer, the concentration of ammonium hydroxide being from about 5 to about 25 percent by weight based on the aqueous ammonium hydroxide solution.

References Cited
UNITED STATES PATENTS

| | | | |
|---|---|---|---|
| 2,538,273 | 1/1951 | Rhines | 260—29.6 PT |
| 2,963,452 | 12/1960 | Sinn | 260—29.7 EM |
| 3,232,899 | 2/1966 | Guziak | 260—29.6 PM |
| 3,364,164 | 1/1968 | Lyons | 260—29.6 E |
| 3,296,172 | 1/1967 | Funck | 260—29.6 TA |
| 3,389,109 | 6/1968 | Harmon | 260—29.6 E |

ROBERT F. WHITE, Primary Examiner

J. B. LOWE, Assistant Examiner

U.S. Cl. X.R.

260—29.6 RW, 29.6 TA, 29.6 XA